United States Patent

Suzuki et al.

[11] Patent Number: 5,907,694
[45] Date of Patent: May 25, 1999

[54] DATA PROCESSING APPARATUS FOR PERFORMING A PIPELINE OPERATION ON A LOAD AND EXTENSION INSTRUCTION

[75] Inventors: Masato Suzuki, Toyonaka; Nobuo Higaki, Osaka; Shinya Miyaji, Hirakata; Nobuki Tominaga, Kyoto; Yoshito Nishimichi, Higashiosaka, all of Japan

[73] Assignee: Matsushita Electric Industrial Co., Ltd., Osaka, Japan

[21] Appl. No.: 08/824,984

[22] Filed: Mar. 27, 1997

[30] Foreign Application Priority Data

Mar. 29, 1996 [JP] Japan ................................. 8-077314

[51] Int. Cl.[6] ................................................. G06F 9/38
[52] U.S. Cl. ........................... 395/386; 395/395; 395/562
[58] Field of Search ............................... 395/386, 392, 395/394, 395, 561, 562, 566, 800.23, 800.41; 364/748.19

[56] References Cited

U.S. PATENT DOCUMENTS

| 5,420,992 | 5/1995 | Killian et al. ........................... 395/500 |
| 5,450,607 | 9/1995 | Kowalczyk et al. ................ 395/800.41 |
| 5,560,039 | 9/1996 | Dulong ................................ 395/800.24 |
| 5,590,352 | 12/1996 | Zuraski, Jr. et al. .............. 395/800.23 |
| 5,638,526 | 6/1997 | Nakada .................................... 395/394 |

FOREIGN PATENT DOCUMENTS

| 2250117 | 10/1990 | Japan . |
| 7262005 | 10/1995 | Japan . |

OTHER PUBLICATIONS

An English Language Summary of JP 7–262005.
An English Language Abstract of JP 2–250117.

Primary Examiner—Parshotam S. Lall
Assistant Examiner—Viet Vu
Attorney, Agent, or Firm—Greenblum & Bernstein P.L.C.

[57] ABSTRACT

The present data processing apparatus effects the pipeline operation for each of the machine cycle time with a plurality of pipeline stages processed in parallel. With respect to a load & extension instruction for instructing with the single instruction a first processing portion for reading the data shorter than the register length from RAM 19 and a second processing portion for zero-extending or the sign-extending the data into the register length, a zero-extension or a sign-extension operation in the second processing operation is executed, in a pipeline stream different from the pipeline stream where a first processing operation is executed or in a pipeline stage different from the pipeline stage where the reading from the storage portion of the first processing operation is executed.

47 Claims, 7 Drawing Sheets

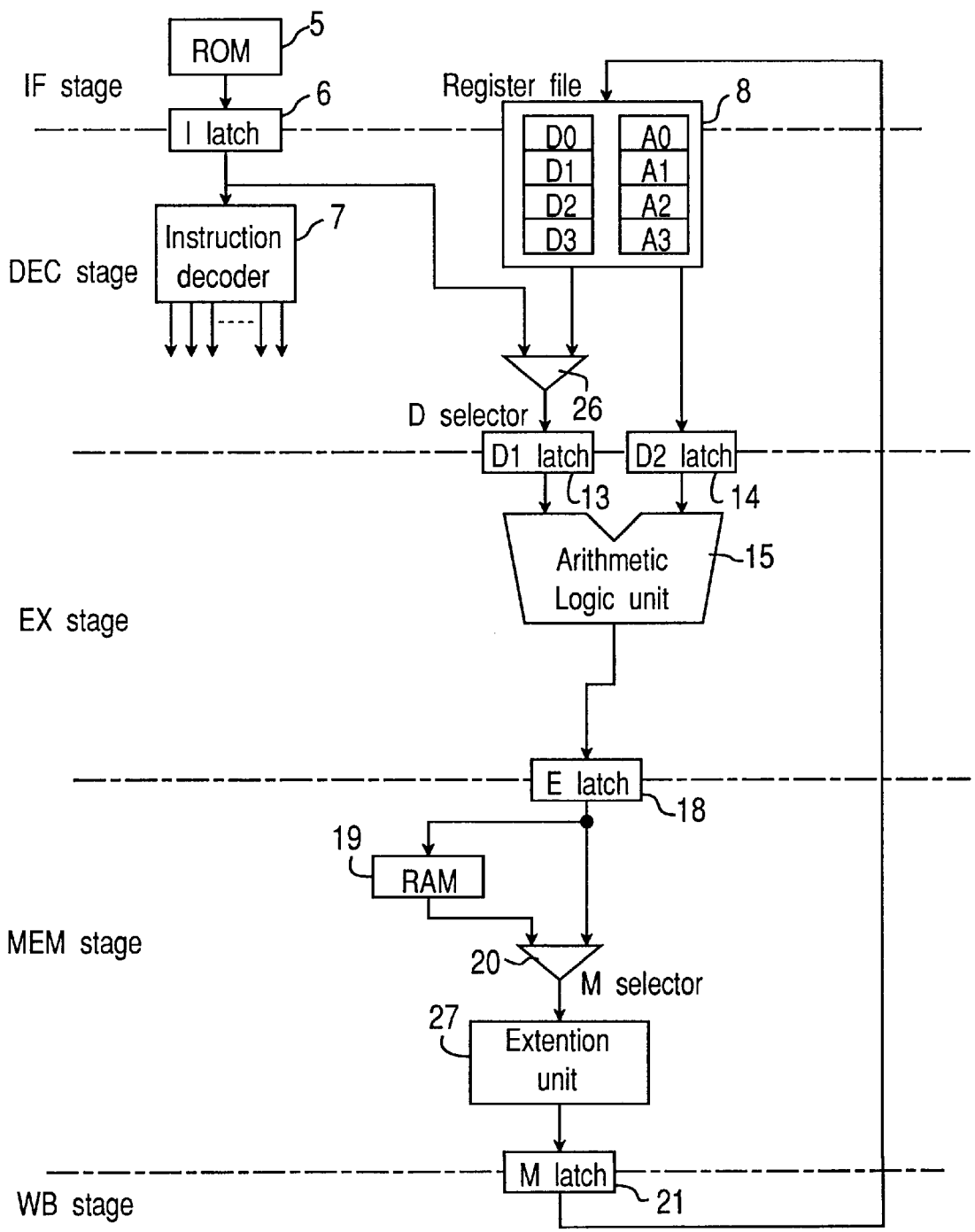

DATA PROCESSING APPARATUS FOR PERFORMING A PIPELINE OPERATION ON A LOAD AND EXTENSION INSTRUCTION

BACKGROUND OF THE INVENTION

1. Field of the Invention

The present invention relates to a data processing apparatus for effecting a pipeline processing operation of data according to instructions of a memory, and more particularly, to a data processing apparatus for processing instructions for extending the data shorter than the register length.

2. Description of the Prior Art

The data processing apparatuses as well as the microcomputers come into general use due to the development of the recent electronic art, so as to be used in all the fields.

The conventional data processing apparatuses can be chiefly divided into a CISC (Complex Instruction Set Computer) type characterized by multiple types of instructions and a RISC (Reduced Instruction Set Computer) type characterized by higher speed through limitation of the instruction types. For example, TRON, MC 68040, and so on are the former, while SPARC, MIPS and so on are the latter. They are respectively of pipeline construction designed to shorten the apparent execution time. The pipeline divides the processing of the instructions into at least reading, decoding, execution stages to execute them in parallel.

FIG. 7 shows a block diagram of a microcomputer as the conventional data processing apparatus. The data processing apparatus is composed of five stage pipeline construction comprising five stages, an instruction fetch stage (hereinafter referred to as IF stage), a decode and register reading stage (hereinafter, as DEC stage), an operation and operand address calculation stage (hereinafter, as EX stage), a memory access stage (hereinafter, as MEM stage), and a register write back stage (hereinafter, as WB stage).

Referring now to FIG. 7, reference numeral 5 is a ROM for accommodating a machine language program, reference numeral 6 is an I latch for accommodating an machine language instruction (hereinafter, as instruction) taken out from the ROM 5, reference numeral 7 is an instruction decoder for deciding an instruction retained in the I latch 6 to control each portion of the microcomputer 4, reference numeral 8 is a register file for accommodating the operand or the address for specifying the operand, reference numeral 26 is a D selector for selecting one from 2 inputs of one portion of the content of the I latch 6 and the output of the register file 8, reference numeral 13 is a D1 latch for accommodating the output of the D selector 26, reference numeral 14 is a D2 latch for accommodating the output of the register file 8, reference numeral 15 is an arithmetic logic unit for effecting arithmetic logical operation with the use of the contents of the D1 latch 13 and the D2 latch 14, reference numeral 18 is an E latch for accommodating the output of the arithmetic logic unit 15, reference numeral 19 is a RAM from which the data is read with the value of the E latch 18 as the address input, reference numeral 20 is a M selector for selecting one from the two inputs of the value of the E latch 18 and the output of the RAM 19, reference numeral 27 is an extension unit for zero-extending or sign-extending the lower 8 bits or the lower 16 bits of the output of the M selector 20 into 32 bits, reference numeral 21 is a M latch for accommodating the output of the extension unit 27. The input/output of all the components except for the ROM 5, the I latch 6, the instruction encoder 7 has a 32-bit width.

The conventional data processing apparatus of such construction as described above loads the 8-bit or 16-bit data for zero-extending or sign-extending it into 32 bits, and assigns a single machine language instruction respectively to the commands of the assembly language program to accommodate in the register. The instruction is encoded by the instruction decoder 7 and is executed as follows in the MEM stage. Namely, the 8-bit or 16-bit data specified by the instruction is read from the RAM 19 and further, is zero-extended or sign-extended into the 32-bit length by the extension unit 27 and the results are accommodated in the register file 8.

In the data processing apparatus having the pipe line construction, it is demanded that the processing time of each stage of the pipeline should be approximately equal and shorted as much as possible. But in the above described conventional data processing apparatus, the processing time of the MEM stage becomes longer than those of the other stages, because it is composed of the access time of the RAM 19, the delay time of the M selector 20, the delay time of the extension unit 27, the set up time of the M latch 21, and the wiring propagation delay time among them. As a result, the upper bound of the operation clock frequency has a problem in that it is controlled lower by the processing time of the MEM sage, thereby being difficult to improve the performance. Also, to make the processing time in the MEM stage approximately equal to the processing time of the other stage, the engagement of the high speed RAM 19 extremely shorter in the access time is demanded, with a problem in that the cost and the consumption power are increased.

SUMMARY OF THE INVENTION

Accordingly, an object of the invention is to provide a data processing apparatus where the pipeline construction is provided to improve the upper bound of the operation clock frequency.

The data processing apparatus of the invention for solving the problems is a data processing apparatus for effecting the pipeline processing operation with a plurality of pipeline stages processed in parallel. The data processing apparatus of the invention is adapted to execute a zero-extension or sign-extension operation in the second processing operation, in a pipeline stage of either of the pipeline stream different from the pipeline stream where a first processing operation is executed or in a pipeline stage different from the pipeline stage where the reading from the storage portion is executed in a pipeline stream where the first processing operation is executed with respect to a load & extension instruction for instructing a first processing for reading the data shorter than the register length from the storage portion and a second processing for accommodating the data in the register by zero-extension or the sign-extension of the data into the register length.

According to the construction, the extension operation is conducted in the pipeline stage for reading of the storage portion longest in the processing time, the pipeline stage different from the pipeline stream or the pipeline stream. The construction has effects of reducing costs accordingly, because the processing time of each stage of the pipeline can be made equal, and shorter as much as possible, so as to improve the performance by increasing the upper bound of the operating frequency, and can make the memory access time longer when the operating frequency is the same.

Furthermore, the data processing apparatus can be provided with a bypassing means for bypassing the data to the pipeline stage where the operation of the successive instruction using the data is executed from the pipeline stage where the data reading operation of the storage portion is executed, and an inhibiting means for inhibiting the bypassing by the bypassing means in accordance with the given conditions.

According to the construction, the processing time of the pipeline stage for reading the storage portion further by the portion of the delaying time by the bypassing.

Now, the inhibiting means can inhibit bypassing by the bypassing means in accordance with at least one of an operation clock frequency of the data processing apparatus, power voltage to be fed, and the load instruction type.

According to the construction, the upper bound of the frequency can be improved or the operation can be effected even at the lower voltage.

Also, the data processing apparatus, provided with a converting means for converting the load & extension instruction into a load instruction instructing the first processing and the extension instruction for instructing the second processing, can execute the zero-extension or the sign-extension in the second processing operation in a pipeline stream different from that of the first processing.

According to the construction, the processing time of the pipeline stage for executing the data reading of the storage portion of the first processing can be shortened, because the zero-extension or the sign-extension in the second processing is executed with the pipeline stream different from that of the first processing.

Furthermore, the data processing apparatus, provided with an extension unit for effecting the zero-extension or sign-extension in the second processing in the stage except for the pipeline stage where the reading in the first processing, can execute the zero-extension or sign-extension in the second processing operation in the pipeline stage different from the pipeline stage where the reading in the first processing.

According to the construction, the processing time of the pipeline stage for reading the first processing can be shortened, because the zero-extension or the sign-extension in the second processing is executed in the pipeline stage different from the pipeline stage where the reading in the first processing is executed.

Also, the data processing apparatus of the invention is a data processing apparatus for effecting a pipeline processing composed of a plurality of pipeline stages including at least an instruction execution stage, a memory access stage and a write back stage. The data processing apparatus comprises a converting means for converting the load & extension instruction for reading the data shorter than the register length from the storage portion, zero-extending or sign-extending the data, and accommodating it in the register into a load instruction for reading the data shorter than the register length from the memory to accommodate it into the lower portion of the register, and into an extension instruction for instructing the zero-extension or sign-extension of the data loaded in accordance with the load instruction, and an instruction decoding means for only reading the data from the storage portion in the memory access stage, when the load instruction is decoded, to effect a controlling operation for accommodation of the data into the lower portion of the resister in the write back stage, and to effect a controlling operation for zero-extension or sign-extension of the register data in the either pipeline stage when the extension is decoded.

According to the construction, the extension processing is conducted in the stage shorter than the other processing time, not that the extension processing is effected in the memory access stage longest in processing time, so as to make the processing time of each stage of the pipeline equal and to shorten it as much as possible. As a result, the upper bound of the operation frequency is made higher and the performance can be improved, and the memory access time can be made longer when the operating frequency is the same, the cost and the consumption power can be reduced accordingly.

Also, the converting means can convert only the load & sign-extension instruction of the load & extension instruction into the load instruction and the sign-extension instruction for sign-extending into the register length the data loaded in accordance with the load instruction.

Furthermore, the data processing apparatus can be provided with a sign-extension unit for sign-extending the data shorter than the register length in the instruction execution stage or a memory access stage.

According to the construction, the sign-extension instruction in the load & extension instruction only has to be converted so that the processing time of the pipeline stage can be shortened for reading the data of the storage portion by the load instruction after the conversion. Also, in the sign-extension unit where the delaying time is larger than the zero-extension unit, the sign-extension can executed in a suitable stage for equalization of the processing time in the pipeline processing of about five stages so that the upper bound of the clock frequency can be improved.

Also, the data processing apparatus is provided with a zero-extension unit for zero-extending the data shorter than the register length into the register length in the memory access stage or the write back stage such that the instruction decoding means can effect the data reading operation from the storage apparatus in the memory access stage of the instruction concerned, when a load & zero-extension instruction is decoded, to further effect a controlling operation for zero-extending by the zero-extension unit, and can effect a controlling operation for sign-extending the data specified by the instruction by the sign-extension unit when the sign-extension instruction is decoded.

According to the construction, when the sign-extension instruction is decoded, the data specified by the instruction is controlled for sign-extension by the sign-extension unit, the instruction decoding means can execute as the single instruction without necessity of converting the load & zero-extension instruction, so as to contract the processing time of the pipeline stage for reading the data of the storage portion, because the processing time of the zero-extension is shorter as compared with the sign-extension.

Now, the data processing apparatus is further provided with a first bypassing means for bypassing the date read in the memory access stage of the preceding instruction to the instruction execution stage of the successive instruction using the data, and a second bypassing means for bypassing the data to be stored in the register in the write back stage of the preceding instruction to the instruction execution stage of the successive instruction using the data. The instruction decoding means can be provided with a bypass controlling means for activating the first bypassing when the preceding instruction is a load instruction except for the load & zero-extension instruction, and for activating a second bypassing means when the preceding instruction is the load & zero-extension instruction.

According to the construction, the instruction decoding means can use effectively the bypass in accordance with the type of the load instruction, provided with a bypass controlling means for activating a first bypassing means when the preceding instruction is a load instruction except for the load & zero-extension instruction, and for activating the second bypassing means when the preceding instruction is a load & zero-extension instruction.

Also, the data processing apparatus is further provided with an inhibiting means for inhibiting the bypassing by the first bypassing means in accordance with the given conditions. The bypass controlling means further can activate the second bypassing means, instead of the first bypassing means, when the first bypassing means is inhibited.

According to the construction, since not only improvement in the clock frequency by the first bypass inhibit, but also the penalty (interlocking) to be caused by the inhibition of the first bypass replaces the second bypassing function, it can be controlled into one stage portion.

Furthermore, the inhibiting means can inhibit the first bypassing means in accordance with at least one of the frequency of the operation clock of the data processing apparatus, and the power voltage to be fed.

According to the construction, the upper bound of the operation clock frequency can be improved or the operation can be effected with the low voltage, because the processing time of the fourth stage can be shortened by the portion of the delay time by the first bypassing.

Also, in the data processing of the invention is a data processing apparatus for effecting a pipeline processing composed of a plurality of pipeline stages comprising at least the instruction execution stage, the memory access stage, the write back stage. The data processing apparatus of the invention comprises an extension unit for zero-extending or sign-extending the data shorter than the register length into the register length in the write back stage, and an instruction decoding means for reading the data shorter than the register length from the storage portion, when the single load & extension instruction for accommodating in the register by the zero-extension or the sign-extension into the register length is decoded, only reading the data from the storage portion in the memory access stage, and effecting a controlling operation for accommodating the data in the register by zero-extending or sign-extending the data into the register length in the write back stage.

According to the construction, even when the load & zero-extension or sign-extension instruction is used in the program, the upper bound of the operation clock can be improved according to the shorter portion of the processing time of the memory access stage.

Also, the data processing apparatus is further provided with a first bypassing means for bypassing the data read in the memory access stage of the preceding instruction to the execution stage of the successive instruction for using the data, and a second bypassing means for bypassing the data to be zero-extended or sign-extended in the write back stage of the preceding instruction to the instruction execution stage of the successive instruction using the data. The instruction decoding means can use effectively the bypass in accordance with the type of the load instruction, provided with a bypassing controlling means for activating a first bypassing means when the preceding instruction is a load instruction except for the load & extension instruction, and for activating the second bypassing means when the preceding instruction is a load & extension instruction.

Further, the data processing apparatus is further provided with an inhibiting means for inhibiting the bypass by the first bypassing means. The bypass controlling means activates the second bypassing means, instead of the first bypassing means, when the first bypassing means is inhibited. According to the construction, since not only improvement in the clock frequency by the first bypass inhibit, but also the penalty (interlocking) to be caused by the inhibition of the first bypassing, can be controlled to one stage portion by the replacement of the second bypassing function.

Also, according to the inhibition means for inhibiting the first bypassing means in accordance with at least one of the operation clock frequency of the data processing apparatus and the power voltage to be fed, the suitable performance can be exhibited in accordance with the frequency of the operation clock and the supply voltage.

Also, the data processing apparatus of the invention comprises a first processing portion for conducting an instruction fetch processing in a first stage, a second processing portion for processing the instruction decoding and the register reading in a second stage, an A latch for handing over the data processed in the second processing portion to a third stage, an arithmetic logic unit for effecting an operation on the data of the A latch, a sign-extension circuit for sign-extending the data of the A latch, a third selector for selecting either of the operation result and the sign-extension result, a third processing portion for processing the instruction execution and the operand address calculation in the third stage, a B latch for handing over the third selector output to a fourth stage, an accessing means for accessing the memory with the B latch output as an address, a fourth processing portion having a selector for selecting the either of the B latch output and the memory data accessed by the accessing means, and effecting a memory reading operation in the fourth stage, a C latch for handing over the fourth selector output to a fifth stage, a zero-extension circuit for zero-extending the C latch output, a fifth processing portion having a storing means for storing in the register the C latch output or the zero-extension result and effecting the register storing operation in the fifth stage, a first bypassing means for bypassing to the A latch the fourth selector output, a second bypassing means for bypassing the output of the zero-extension circuit to the A latch, and an inhibiting means for inhibiting the bypassing means in accordance with the given conditions. According to the construction, the processing time of the fourth stage longest in the processing time can be shortened, because the extension cannot be executed in the fourth stage. Further, the processing of the fourth stage can be further shortened by the delay time of the bypass by the first bypass inhibition. Also, when the second bypassing is alternated when the first bypassing is inhibited, the bypassing function can be effectively used.

Furthermore, the inhibiting means is adapted to inhibit the first bypassing means in accordance with either of the operation clock frequency of the data processing apparatus and the power voltage, the upper bound of the frequency can be improved or the operation can be effected even with the low voltage.

Also, the data processing apparatus further provided with a converting means for converting the load instruction and the single load & extension instruction having the command content of the extension instruction into the extension instruction into the load instruction and the extension instruction can shorten the processing time of the fourth stage longest in the processing time, because the code enlargement can be executed in the third stage.

BRIEF DESCRIPTION OF THE DRAWINGS

These and other objects, features and advantages of the present invention will become clear from the following description taken in conjunction with the preferred embodiments with reference to the accompanying drawings throughout which like parts are designated by like reference numerals, and in which:

FIG. 7 is a block diagram of the microcomputer as the conventional data processing apparatus.

DETAILED DESCRIPTION OF THE PREFERRED EMBODIMENTS

The embodiment of the invention will be described hereinafter with reference to FIG. 1 through FIG. 6.

Figure 1:
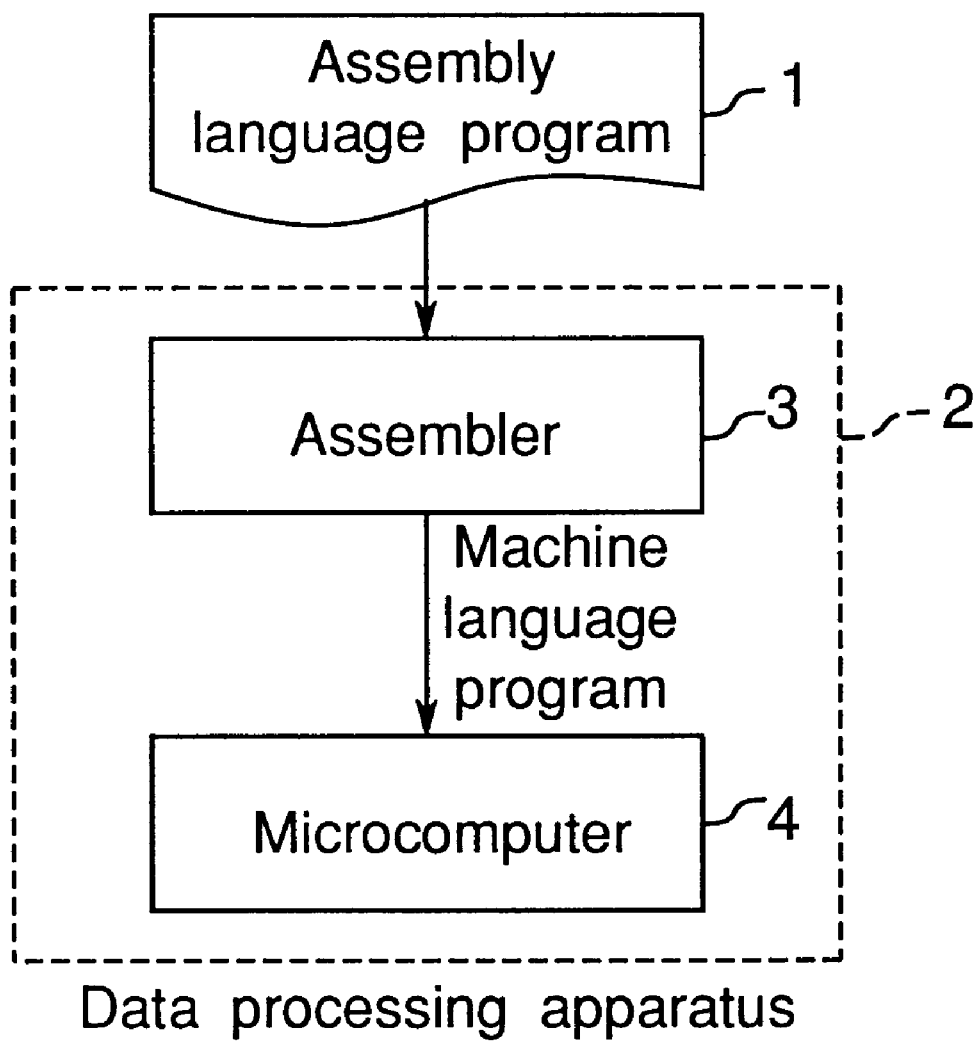
FIG. 1 is a schematic block diagram of a data processing apparatus in one embodiment of the invention.

FIG. 1 is a schematic construction diagram of the data processing apparatus. The data processing apparatus 2 is composed of an assembler 3 for inputting an assembly language program 1 and converting it into a mechanical language program, and a microcomputer 4 for operating in accordance with the mechanical language program.

In the assembler 3 of the invention, the next converting function is added to the normal assembler. Namely, a function for inverting a load & extension instruction into two instructions, a load instruction and an extension instruction is added. Now, the load & extension instruction is an instruction for reading from the memory the data shorter than the register length to zero-extend or sign-extend the data into the register length for storing it in the register. The load instruction is an instruction for reading from the memory the data shorter than the register length to write back it to the register. The extension instruction is an instruction for reading the register data to zero-extend or sign-extend it for writing back it to the register. The extension instruction comprises a zero-extension instruction and a sign-extension instruction.

The microcomputer 4 has five-stage pipeline construction composed of five stages of an instruction fetch stage (hereinafter, referred to as IF stage), a decoding and register reading stage (hereinafter, as DEC stage), an operation and operand address calculation stage (hereinafter, as EX stage), a memory access stage (hereinafter, as MEM stage), and a register write back stage (hereinafter, as WB stage).

Figure 2:
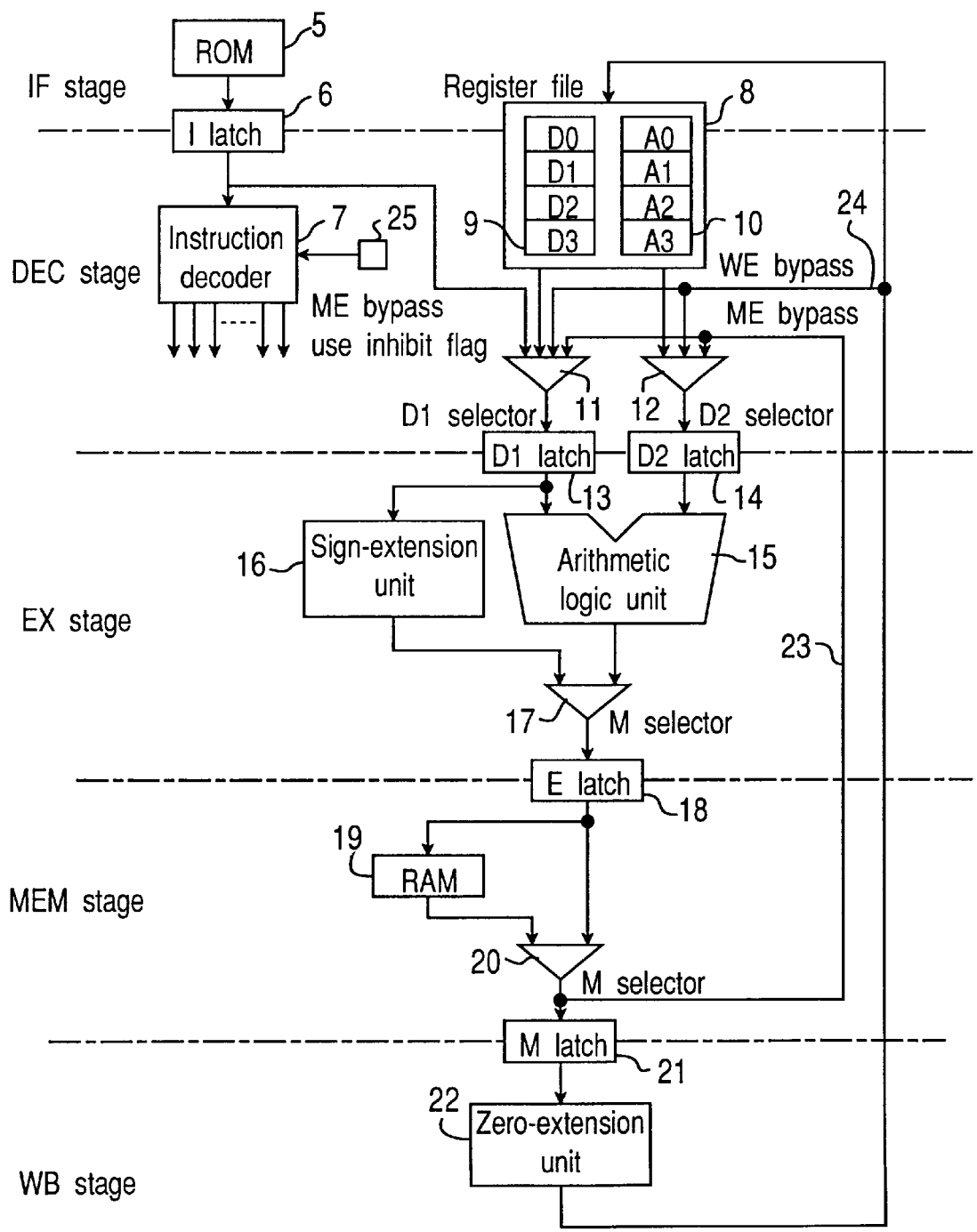
FIG. 2 is a block diagram of a microcomputer in the embodiment.

FIG. 2 is a block diagram showing the construction of the microcomputer 4.

Referring now to FIG. 2, reference numeral 5 is a ROM for accommodating a machine language program, reference numeral 6 is an I latch for accommodating the machine language instruction (hereinafter, hereinafter referred as instruction) taken out from the ROM 5. Reference numeral 7 is an instruction decoder for decoding an instruction retained in the I latch 6 to control each portion of the microcomputer 4.

Reference numeral 8 is a register file for accommodating the operand data or the address for specifying the operand. The register file 8 is composed of a data register 9 for mainly accommodating the operand data and address register 10 for mainly accommodating the address. The data register 9 is composed of four registers D0 through D3, and the address register 10 is composed of four registers A0 through A3. The register length is to be 32 bits.

Reference numeral 11 is a D1 selector for selecting one from four inputs, one portion of the content of the I latch 6, the output of the register file 8, and the other two.

Reference numeral 12 is a D2 selector for selecting one from three outputs of the output of the register file 8 and the other two.

Reference numerals 13 and 14 are a D1 latch and a D2 latch for respectively accommodating the outputs of the D1 selector 11 and of the D2 selector 12.

Reference numeral 15 is an arithmetic logic unit for effecting an arithmetic logical operation with the use of the content of the D1 latch 13 and the D2 latch 14.

Reference numeral 16 is a sign-extension unit for copying (hereinafter referred to as sign-extension to 32 bits of the lower 8 bits and lower 16 bits respectively) the 8th bit or 16th bit value from the least significant of the output of the D1 latch 13 into the 24th bit and 16th bit on the over side respectively. An operation is effected in the MEN stage.

Reference numeral 17 is an E selector for selecting one from the two inputs of the output of the arithmetic logic unit 15, and the output of the sign-extension unit 16.

Reference numeral 18 is an E latch for accommodating the output of the E selector 17.

Reference numeral 19 is a RAM for reading the data with the value of the E latch 18 as the address input.

Reference numeral 20 is a M selector for selecting one from two inputs of the value of the E latch 18 and the output of the RAM 19.

Reference numeral 21 is a M latch for accommodating the output of the M selector 20.

Reference numeral 22 is a zero-extension unit for inserting 0 (hereinafter refereed to as zero-extension to the 32 bits of the lower 8 bits and the lower 16 bits respectively) into the over 24 bits or 16 bits of the output of the M latch 21. The unit operates in the WB stage.

Reference numeral 23 is a ME bypass for connecting the output of the M selector 20 with the D1 selector 11 and the D2 selector 12.

Reference numeral 24 is a WE bypass for connecting the output of the zero-extension unit 22 with the D1 selector 11 and the D2 selector 12.

Reference numeral 25 is a flip flop which retains a ME bypass use inhibit flag. The flag is set when the operation clock frequency exceeds the given frequency, and is reset when the operation clock frequency is a given frequency or lower.

The I latch 6, the register file 8, the D1 latch 13 and the D2 latch 14, the E latch 18, the M latch 21 of the construction of the microcomputer 4 are respectively provided as a pipeline register for handing over the processing results between the stages. Also, the input/output of all the components of the microcomputer except for the ROM 5, the I latch 6, the instruction decoder 7, the ME bypass use inhibiting flag 25 has the 32 bit width.

The ME bypass 23 and the WE bypass 24 are provided for realizing a bypassing function for passing one portion of the pipeline stage among the MEM stage of the preceding instruction, the WB stage, and the EX stage of the successive instruction. The bypassing function (referred to as forwarding or short circuiting) is a known art, which reduces a pipeline interlock to be caused when an instruction following the processing results of a preceding instruction is used (in a case of data depending relation).

The ME bypass 23 transmits the execution results of the MEM stage of the preceding instruction to the EX stage of the successive instruction using the execution result by the supplying it to the D1 latch 13, and the D2 latch 14 through the sectors 11 and 12, thereby removing the interlocking of two cycle portions. The WE bypass 24 transmits the data of the WB stage of the preceding instruction to the EX stage of the successive instruction using the data by feeding it to the D1 latch 13 and the D2 latch 14, thereby removing the interlocking of one cycle portion.

The instruction decoder 7 has a function for inhibiting the bypassing function in addition to the controlling operation of each portion of the microcomputer 4. The instruction decoder 7 about the bypassing function detects whether or not the successive instruction effects the reading of the same register (whether or not the data dependent relation is provided or not) with the successive instructions when the preceding instruction is an instruction accompanying the storing operation to the register of the register file 8. When the successive instruction for reading the register is decoded, the EX stage of the successive instruction is activated, waiting for the completion of the MEM stage of the preceding instruction or of the WB stage thereof. A controlling operation is effected for selecting of the ME bypass 23 or the WE bypass 24 with respect to the D1 selector 11 and the D2 selector 12. But when the preceding instruction is an instruction for loading the 32-bit data, and the ME bypass use inhibit flag 25 is set, the ME bypass is not selected. Further, when the instruction decoder 7 uses the ME bypass in the detecting of the data independent relation when the ME bypass use inhibit flag 25 is cleared. When it is set, the interlocking is caused as usual when the data independent relation is detected, the ME bypass is not used. The processing time of the MEM stage is shortened by the portion of the delay time (the delay time and the wire delaying time of the D1 selector 11 or D2 selector 12) due to the bypassing through the bypass inhibiting operation, thereby improving the upper bound of the clock frequency.

The operation of the data processing apparatus of the present embodiment constructed as described above will be described hereinafter.

Figure 3:
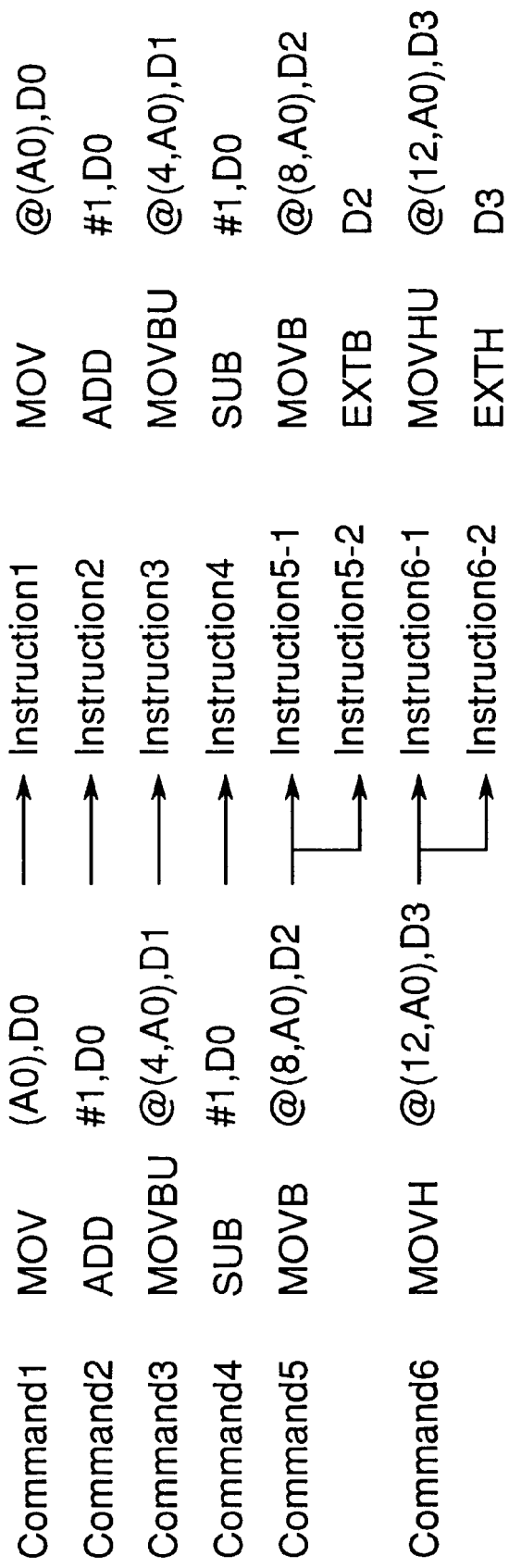
FIG. 3 shows a program example in the same embodiment.

FIG. 3 shows one example of a machine language program after the conversion by the assembly language program 1 and the assembler 3. Although the machine language program is originally of the bit strings of 0 and 1, and is represented in mnemonic the same as the assembly language program to express the meaning. The arrow marks stand for equivalent relation between them. The commands 1 through 4 of the assembly language program is converted one to one into instructions 1 through 4 of the machine language program as they are. A command 5 is converted into an instruction 5-1 and an instruction 5-2, and a command 6 is converted into an instruction 6-1 and an instruction 6-2. The contents of commands 1 through 6 and of instructions 1 through 6-2 are as follows.

(a) Assembly language program

Command 1: MOV @(AO),DO (a command for loading into the DO resister a 32-bit data existing in an address shown by the value of the AO register shows)

Command 2: ADD #1,DO (a command for adding 1 into the value of the DO register and accommodating the results in the DO register)

Command 3: MOVBU @(4,AO),D1

(a command for locating the 8-bit data existing in an address where 4-byte deflection is added to the value of the AO register to accommodate the results, zero-extended into 32 bits, into the D1 register)

Command 4: SUB #1,DO (a command for reducing 1 from the value of the DO register to accommodating the results into the DO register)

Command 5: MOVB @(8,AO),D2

(a command for loading the 8-byte data existing in an address where 8-byte deflection is added to the value of the AO register to accommodate the results sign-extended to 32 bits in the D2 register)

Command 6: MOVH @(12,AO),D3

(a command for loading the 16-bit data existing in an address where the reflection of 12-byte is added to the value of the AO register to accommodate the results, sign-extended to the 32 bits, into the D3 register)

(b) Machine language program (Mnemonic representation)

Instruction 1: MOV @(AO),DO (an instruction in content the same as the command 1)

Instruction 2: ADD #1,DO (an instruction in content the same as the command 2)

Instruction 3: MOVBU @(4,AO),D1

(an instruction in content the same as the command 3)

Instruction 4: SUB #1,DO (an instruction in content the same as the command 4)

Instruction 5-1: MOVBU @(8,AO),D2

(an instruction for loading the 8-bit data located in an address where the 8-byte deflection is added to the value of the AO register to accommodate the results, zero-extended to 32 bits, in the D2 register)

Instruction 5-2: EXTB D2

(an instruction for accommodating in the D2 register the results where the lower 8 bits of the value of the D2 register is sign-extended into the 32 bits)

Instruction 6-1: MOVH @(12,AO),D3

(an instruction for loading the 16-bit data located in an address where the 12-byte deflection is added to the value of the AO register to accommodate the results, zero-extended to 32 bits, in the D3 register)

Instruction 6-2: EXTH D3

(an instruction for accommodating in the D3 register the results where the lower 16 bits of the value of the D3 register is sign-extended to 32 bits)

A command for loading the data of the 8-bits or 16-bits in the assembly language program for sign-extending in this manner is loaded and is converted into an instruction of the zero-extension and an instruction of the sign-extension.

Figure 4:
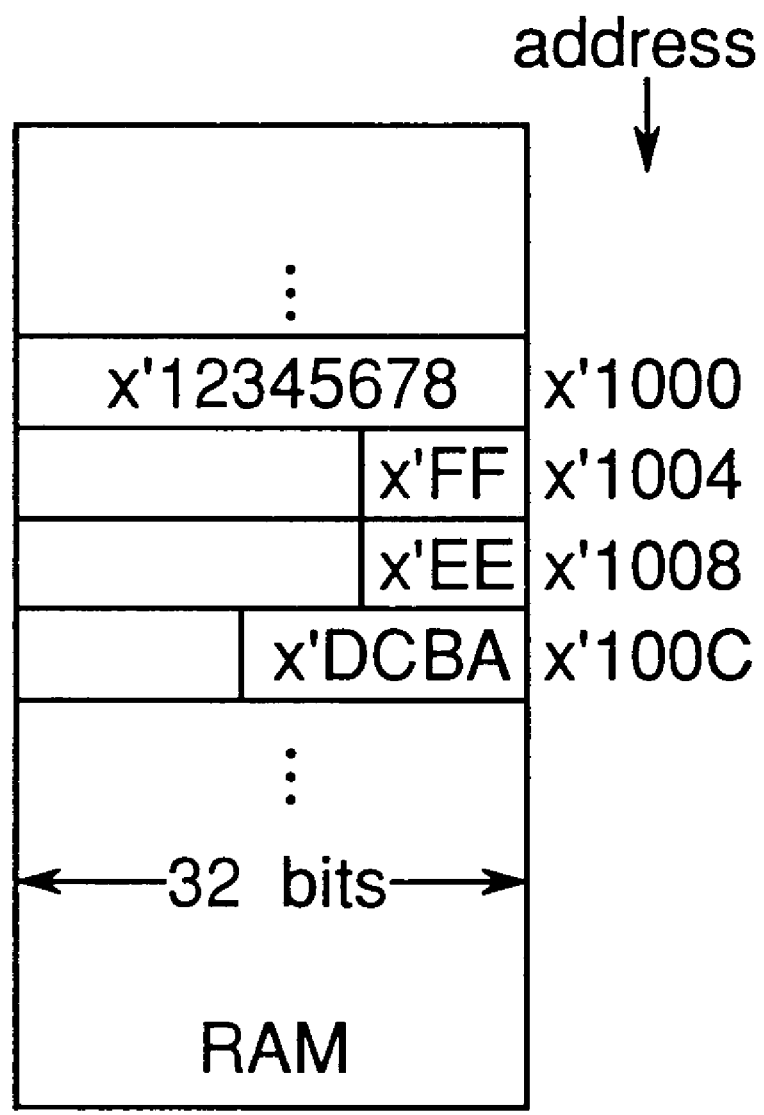
FIG. 4 is a diagram for illustrating the contents of the RAM in accordance with the program example.

FIG. 4 shows a content explaining diagram of the RAM 19 in accordance with the exemplified program of FIG. 3. Data x'12345678 is accommodated in x'1000 address through x'1003 address, data x'FF in x'1004 address, data x'EE in x'1008, and data x'DCBA in x'100C address through x'100D address. Now, the address is given for each byte (8 bits) and the data is to be accessed with the address of the least significant byte. The x' shows a hexadecimal.

Then, an operation will be described in a case where the ME bypass use inhibiting flag 25 is cleared.

Figure 5A:
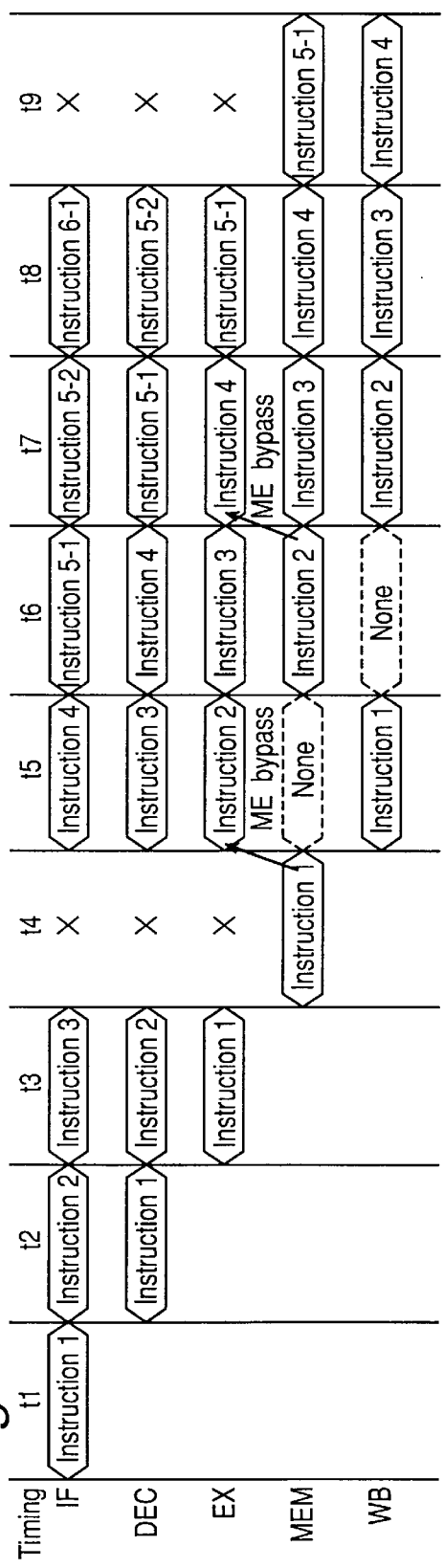
FIGS. 5A and 5B are operation timing charts of the microcomputer in accordance with the exemplified program.
Figure 5B:
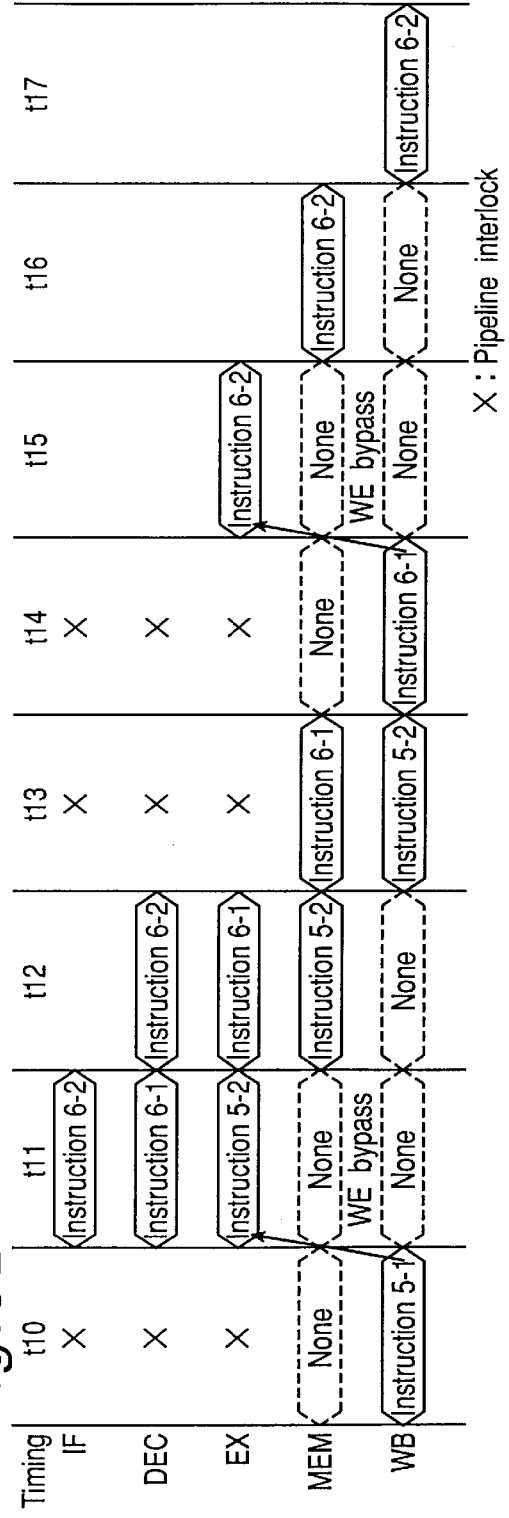

FIG. 5 shows an operation timing chart of the microcomputer 4. FIG. 5 shows instructions, where the operation in the execution of the machine language program of FIG. 3 is processed in the IF stage, DEC stage, EX stage, MEM stage, WB stage, for every timing called a machine cycle. For example, the instruction 1 of FIG. 5, timing t1 through t5, is processed through the pipe line stages sequentially. Flowing of such instructions is generally called a pipeline stream. The operation will be described for each timing in an order time is passing. Timing t1 through t9 is shown in FIG. 5A, and timing t10 through timing t17 in FIG. 5B. Also, the initial value x'00001000 is to be accommodated in the AO register.

(Timing t1)

IF stage: Instruction [MOV @(AO),DO]

The instruction 1 is read from the ROM 5 and is accommodated in the I latch 6.

(Timing t2)

DEC stage: Instruction 1 [MOV @(AO),DO]

The instruction 1 accommodated in the I latch 6 is decoded by an instruction decoder 7, the AO register is read from the address register 10 and the x'00001000 is accommodated in the D2 latch 14 through the D2 selector 12.

IF stage: Instruction 2 [ADD #1,DO]

The instruction 2 is read from the ROM 5 and is accommodated in the I latch 6.

(Timing t3)

EX stage: Instruction 1 [MOV @(AO),DO]

The value accommodated in the D2 latch 14 is transmitted as it is by the arithmetic logic unit 15 and the x'00001000 is accommodated in the E latch 18 through the E selector 17.

DEC stage: Instruction 2 [ADD #1,DO]

The instruction 2 accommodated in the I latch 6 is decoded by an instruction decoder 7, and the in-line value x'00000001 of the instruction 2 accommodated in the I latch 6 is accommodated in the D1 latch 13 through the D1 selector 11. Although the D0 register from the data register 9 is read, and is accommodated in the D2 latch 14 through the D2 selector 12, the D0 register is undefined in the value of the D2 latch 14 due to non-definition.

IF stage: Instruction 3 [MOVBU @(4,AO),D1]

The instruction 3 is read from the ROM 5 and is accommodated in the I latch 6.

(Timing t4)

MEM stage: Instruction 1 [MOV @(AO),DO]

The 32-bit data is read from the x'1000 address of the RAM 19 by a value accommodated in the E latch 18 and x'12345678 is accommodated in the M latch 21 through the M selector 20.

EX stage: pipeline interlock

DEC stage: pipeline interlock

The instruction decoder 7 controls the D2 selector 12 for selection of the ME bypass 23, and the x'12345678 to be outputted by the M selector 20 is written on the D2 latch 14.

IF stage: pipeline interlock (Timing t5)

WB stage: Instruction 1 [MOV @(AO),DO]

The value accommodated in the M latch 21 is transmitted as it is in the zero-extension unit 22, and the x'12345678 is accommodated in the D0 register of the data register 9.

MEM stage: none

EX stage: Instruction 2 [ADD #1,DO]

The x'00000001 accommodated in the D1 latch 13 and the x'12345678 accommodated in the D2 latch 14 are added by the arithmetic logic unit 15 and the x'12345679 is accommodated in the E latch 18 through the E selector 17.

DEC stage: Instruction 3 [MOVBU @(4,AO), D1]

The instruction 3 accommodated in the I latch 6 is decoded by the instruction decoder 7, and the deflection x'00000004 of the instruction 3 accommodated in the I latch 6 is accommodated in the D1 latch 13 through the D1 selector 11. The AO register is read from the address register 10 and the x'00001000 is accommodated in the D2 latch 14 through the D2 selector 12.

IF stage: Instruction 4 [SUB #1,DO]

The instruction 4 is read from the ROM 5, and is accommodated in the I latch 6.

(Timing t6)

WB stage: none

MEM stage: Instruction 2 [ADD #1,DO]

M selector 20 selects the value accommodated in the E latch 18 and the x'12345679 is accommodated in the M latch 21.

EX stage: Instruction 3 [MOVBU @(4,AO),D1]

The x'00000004 accommodated in the D1 latch 13 and the x'00001000 accommodated in the D2 latch 14 are added by the arithmetic logic unit 15 and the x'00001004 is accommodated in the E latch 18 by way of the E selector 17.

DEC stage: Instruction 4 [SUB #1,DO]

An instruction 4 accommodated in the I latch 6 is decoded by an instruction decoder 7 and the in-line value x'00000001 of the instruction 4 accommodated in the I latch 6 is accommodated in the D1 latch 13 through the D1 selector 11. Also, the instruction decoder 7 is controlled for selection of the ME bypass 23 with respect to the D2 selector 12, and the x'12345679 to be outputted by the M selector 20 is accommodated to the D2 latch 14.

IF stage: Instruction 5-1 [MOVBU @(8,AO),D2]

The instruction 5-1 is read from the ROM 5 and is accommodated in the I latch 6.

(Timing t7)

WB stage: Instruction 2 [ADD #1,DO]

The value accommodated in the M latch 21 is transmitted as it is in the zero-extension unit 22, and the x'12345679 is accommodated into the D0 register of the data register 9.

MEM stage: Instruction 3 [MOVBU @(4,AO),D1]

The 8-bit data is read from the x'1004 address of the RAM 19 by the value accommodated in the E latch 18 is read, and the x' . . . FF (. is undefined) is accommodated in the M latch 21 through the M selector 20.

EX stage: Instruction 4 [SUB #1,DO]

The x'00000001 accommodated in the D1 latch 13 is reduced from the x'12345679 accommodated in the D2 latch 14 in the arithmetic unit 15 and the x'12345678 is accommodated in the E latch 18 through the E selector 17.

DEC stage: Instruction 5-1 [MOVBU @(8,AO),D2]

The instruction 5-1 accommodated in the I latch 6 is decoded by a code decoder 7, and the deflection x'00000008 of the instruction 5-1 accommodated in the I latch 6 is accommodated in the D1 latch 13 through the D1 selector 11. The AO register is read from the address register 10 and the x'00001000 is accommodated in the D2 latch 14 through the D2 selector 12.

IF stage: Instruction 5-2 [EXTB D2]

The instruction 5-2 is read from the ROM 5 and is accommodated into the I latch 6.

(Timing t8)

WB stage: Instruction 3 [MOVBU @(4,AO),D1]

The lower 8 bit of the value accommodated in the M latch 21 is zero-extended into the 32 bit by the zero-extension unit 22, and the x'000000FF is accommodated in the D1 register of the data register 9.

MEM stage: Instruction 4 [SUB #1,DO]

The M selector 20 selects the value accommodated in the E latch 18 and the x'12345678 is accommodated in the M latch 21.

EX stage: Instruction 5-1 [MOVBU @(8,AO),D2]

The x'00000008 accommodated in the D1 latch 13 and the x'00001000 accommodated in the D2 latch 14 are added by the arithmetic logic unit 15 and the x'00001008 is accommodated in the E latch 18 through E selector 17.

DEC stage: Instruction 5-2 [EXTB D2]

Although the instruction 5-2 accommodated in the I latch 6 is decoded by the instruction decoder 7, the D2 register is read from the data register 9, and is accommodated in the D1 latch 13 through the D1 selector 11, the value of the D1 latch 13 is undefined, because the D2 register is undefinable. The instruction decoder 7 stops the flowing of the pipe line in the IF, DEC, EX stages at the next timing t9 and the timing t10 till the completion of the WB stage of the instruction 5-1.

IF stage: Instruction 6-1 [MOVH @(12,AO),D3]

The instruction 6-1 is read from the ROM 5, and is accommodated in the I latch 6.
(Timing t9)

WB stage: Instruction 4 [SUB #1,DO]

The value accommodated in the M latch 21 is transmitted as it is in the zero-extension unit 22, and the x'12345678 is accommodated in the D0 register of the data register 9.

MEM stage: Instruction 5-1 [MOVBU @(8,AO),D2]

The 8-bit data is read from the x'1008 address of the RAM 19 by the value accommodated in the E latch 18 and the x' . . . EE (. is undefined) in the M latch 21 through the M selector 20.

EX stage: pipeline interlock
DEC stage: pipeline interlock
IF stage: pipeline interlock
(Timing t10)

WB stage: Instruction 5-1 [MOVBU @(8,AO),D2]

The lower 8 bit-of the value accommodated in the M latch 21 is zero-extended into 32 bits by the zero-extension unit 22, and the x'000000EE is accommodated in the D2 register of the data register 9.

MEM stage: none
EX stage: pipeline interlock
DEC stage: pipeline interlock

The instruction decoder 7 controls for selection of the WE bypass 24 with respect to the D1 selector 11, and the x'000000EE outputted by the zero-extension unit 22 is written in the D1 latch 13.

IF stage: pipeline interlock
(Timing t11)

WB stage: none
MEM stage: none
EX stage: Instruction 5-2 [EXTB D2]

The lower 8 bits of the value accommodated in the D1 latch 13 is sign-extended into 32 bits by the sign-extension unit 16, and the x'FFFFFFEE is accommodated in the E latch 18 through the E selector 17.

DEC stage: Instruction 6-1 [MOVH @(12,AO0,D3]

The instruction 6-1 accommodated in the I latch 6 is decoded by the instruction decoder 7, and the deflection x'0000000C of the instruction 6-1 accommodated in the I latch 6 is accommodated in the D1 latch 13 through the D1 selector 11. The AO register is read from the address register 10 and the x'00001000 is accommodated in the D2 latch 14 through the D2 selector 12.

IF stage: Instruction 6-2 [EXTH D3]

The instruction 6-2 is read from the ROM 5 and is accommodated in the I latch 6.
(Timing t12)

WB stage: none
MEM stage: Instruction 5-2 [EXTB D2]

The M selector 20 selects the value accommodated in the E latch 18, and the x'FFFFFFEE is accommodated in the M latch 21.

EX stage: instruction 6-1 [MOVH @(12,AO),D3]

The x'0000000C accommodated in the D1 latch 13 and the x'00001000 accommodated in the D2 latch 14 are added by the arithmetic logic unit 15, and the x'0000100C is accommodated in the E latch 18 through the E selector 17.

DEC stage: instruction 6-2 [EXTH D3]

Although the instruction 6-2 accommodated in the I latch 6 is decoded by the instruction decoder 7, and the D3 register is read from the data register 9, and is accommodated in the D1 latch 13 through the D1 selector 11, the value of the D1 latch 13 is undefined, because the D3 register is undefinable. The instruction decoder 7 suspends the flowing of the pipeline in the IF, DEC, EX stages at the next timing t13 and the timing t14, namely, till the completion of the WB stage of the instruction 6-1.
(Timing t13)

WB stage: Instruction 5-2 [EXTB D2]

The value accommodated in the M latch 21 is transmitted as it is in the zero-extension unit 22, and x'FFFFFFEE is accommodated in the D2 register of the data register 9.

MEM stage: Instruction 6-1 [MOVH @(12,AO),D3]

The 16-bit data is read from the x'100C address of the RAM 19 by the value accommodated in the E latch 18, and the x'. . . . . DCBA (. is undefined) is accommodated in the M latch 21 through the M selector 20.

EX stage: pipeline interlock
DEC stage: pipeline interlock
IF stage: pipeline interlock
(Timing t14)

WB stage: Instruction 6-1 [MOVH @(12,AO),D3]

The under 16 bits of the value accommodated in the M latch 21 is zero-extended into 32 bits by the zero-extension unit 22, and the x'0000DCBA is accommodated in the D3 register of the data register 9.

MEM stage: none
EX stage: pipeline interlock
DEC stage: pipeline interlock

The instruction decoder 7 controls the D1 selector 11 for selection of the WE bypass 24 and the x'0000DCBA outputted by the zero-extension unit 22 is written on the D1 latch 13.

IF stage: pipeline interlock
(Timing t15)

WB stage: none
MEM stage: none
EX stage: Instruction 6-2 [EXTH D3]

The lower 16 bits of the value accommodated in the D1 latch 13 is sign-extended to 32 bits by the sign-extension unit 16, and the x'FFFFDCBA is accommodated in the E latch 18 through the E selector 17.
(Timing t16)

WB stage: none
MEM stage: Instruction 6-2 [EXTH D3]

The M selector 20 selects the value accommodated in the E latch 18 and the x'FFFFDCBA is accommodated in the M latch 21.
(Timing t17)

WB stage: Instruction 6-2 [EXTH D3]

The value accommodated in the M latch 21 is transmitted as it is in the zero-extension unit 22, and the x'FFFFDCBA is accommodated in the D3 register of the data register 9.

Figure 6A:
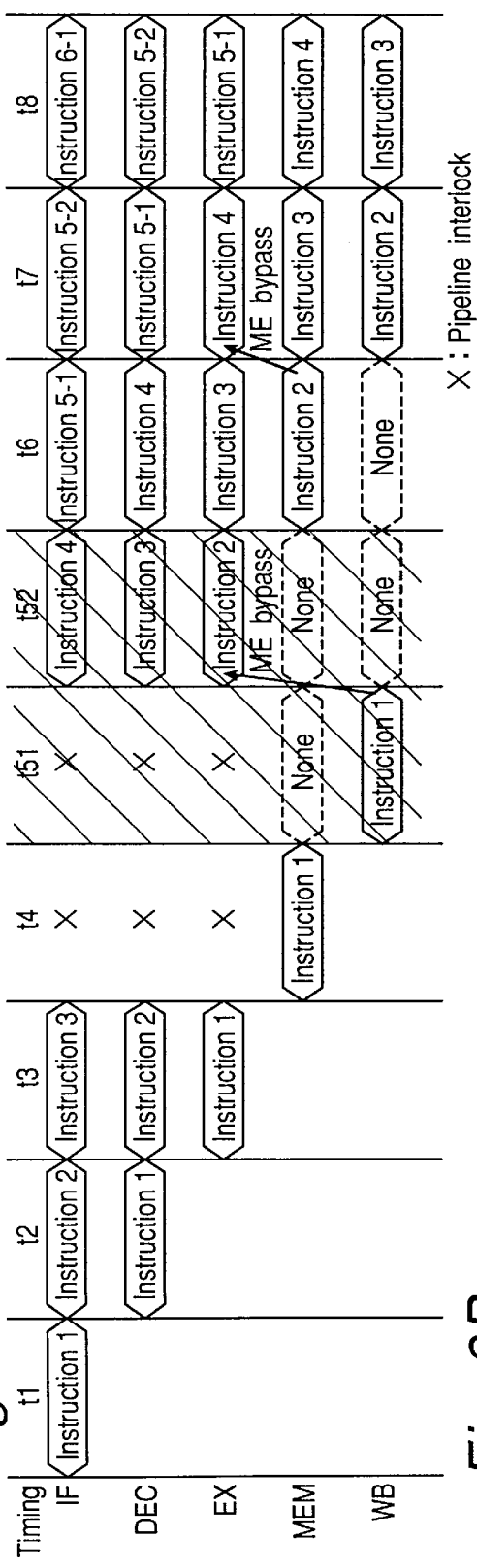
FIGS. 6A and 6B are operation timing charts of the microcomputer in accordance with the exemplified program of FIG. 3.
Figure 6B:
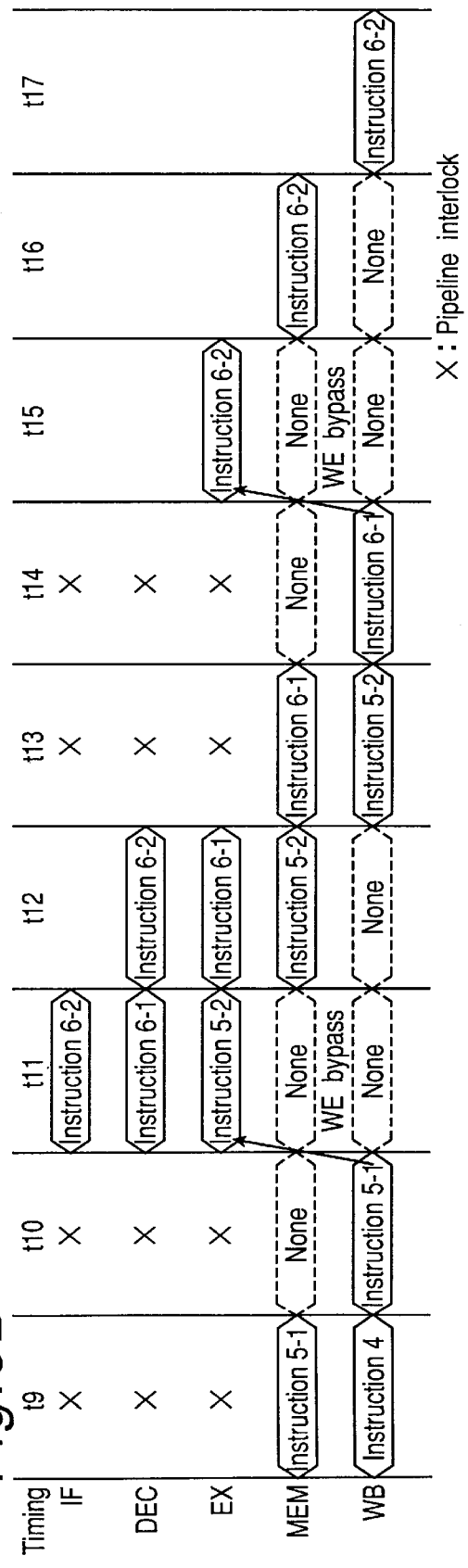

Then, a case is shown where the ME bypass use inhibit flag 25 is set. The operation timing diagram is shown in FIGS. 6A and 6B. FIGS. 5A or 5B and FIGS. 6A or 6B are the same except that the timing t5 of FIGS. 5A or 5B is replaced by the timing t51 and the timing t52 of FIGS. 6A or 6B. Only the portion is described, different from a case where the ME bypass use inhibit flag 25 is cleared.

(Timing t4)
  DEC stage: pipeline interlock
  No ME bypass 23 is selected.
(Timing t51)
  WB stage: Instruction 1 [MOV @(AO), DO]
  The value accommodated in the M latch 21 is transmitted as it is in the zero-extension unit 22 and the x'12345678 is accommodated in the D0 register of the data register 9.
  MEM stage: none
  EX stage: pipeline interlock
  DEC stage: pipeline interlock
  The instruction decoder 7 controls for the selection of the WE bypass 24 with respect to the selector 12, and the x'12345678 outputted by the zero-extension unit 22 is written in the D2 latch 14.
  IF stage: pipeline interlock
(Timing t52)
  WB stage: none
  MEM stage: none
  EX stage: Instruction 2 [ADD #1,DO]
  The x'00000001 accommodated in the D1 latch 13 and the x'12345678 accommodated in the D2 latch 14 are added, and the x'12345679 is accommodated in the E latch 18 through the E selector 17.
  DEC stage: Instruction 3 [MOVBU @(4,AO),D1]
  The instruction 3 accommodated in the I latch 6 is decoded by the instruction decoder 7, and the deflection x'00000004 of the instruction 3 accommodated in the I latch 6 is accommodated in the D1 latch 13 through the D1 selector 11. The A0 register is read from the address register 10 and the x'00001000 is accommodated in the D2 latch 14 through the D2 selector 12.
  IF stage: Instruction 4 [SUB #1,DO]
  The instruction 4 is read from the ROM 5 and is accommodated in the I latch 6.

According to the present embodiment as described above, the extension in the zero-extension unit 22 is conducted in the WB stage different from the MEM stage for accessing the RAM 19. The WB stage is shorter in the processing time, as compared with other stages, if the processing of the zero-extension unit 22 is added, because the WB stage conducts a accommodating operation only into the register file 8 in addition. Further, since the zero-extension unit 22 is limited to the zero-extension operation comparatively smaller in delaying time, the processing time of the WB stage can be refrained from being added. Furthermore, even when the data read from the RAM 19 is used by the successive instruction, the data is obtained directly by way of the ME bypass 23 or the WE bypass 24 from the results of the MEM stage or the WB stage by the D1 selector 11 and the D2 selector 12, not that the data accommodated in the register file 8 is read in the DEC stage. The waiting time of the pipeline of one machine cycle can be shortened in the usage after the reading of the 8-bit or 16-bit data. In the usage after the reading of 32-bit data highest in frequency, the waiting time of the pipeline of the 1 or 2 machine cycles can be shortened. Furthermore, the ME bypass use inhibit flag 25 can be set for specification not to inset into the MEM stage the delaying time of the D1 sector 11 and D2 selector 12, so as to shorten the processing time of the MEM stage to further increase the upper bound of the operating frequency.

Furthermore, in the present embodiment, the zero-extension unit 22, processed in the WB stage, can be removed. The sign-extension unit 16 can be replaced by an extension unit which is capable of effecting the sign-extension operation as well as the zero-extension operation. A load instruction (for example, an instruction 3 of FIG. 3) for accompanying the zero-extension can be inverted into the load instruction and the zero-extension instruction (for example, EXTBU instruction and EXTHU instruction equivalent to the instruction 5-2 and the instruction 6-2 of FIG. 3) in the assembler 3. In the load instruction, an ineffective value has only to be written or not to be rewritten in the over of the register without enlargement. As compared with the conversion art, the accessing operation of the RAM 19 and the extension operation in the extension unit are not required to be effected in series by the single instruction.

Also, in the embodiment, the zero-extension unit 22, processed in the WB stage, has only to be processed after the M selector 20 of the MEM stage as in the conventional one. What is required to be operated in series in the single instruction as compared with the conventional art is limited to the zero-extension unit 22 only which is smaller in the access of the RAM 19, and the delaying time.

Also, although in the embodiment, a sign-extension unit 16 is processed in the EX stage, the zero-extension unit 22, instead of the sign-extension unit, can be replaced by an extension unit which can be zero enlarged and code enlarged. The dividing conversion into two instructions of the load instruction accompanying the extension in the assembler 3 is not necessary to be effected in both the sign-extension and the zero-extension. Therefore, as compared with the conventional art, the extension in the extension unit can be conducted in the WB stage where the processing amount is less, as compared with the other stages, in addition to the access of the RAM 19.

Also, although in the embodiment, the ME bypass 23 and the WE bypass 24 are provided and they are adapted to be selected in the D1 selector 11 and the D2 selector 12, the data more extended in the reading from the RAM 19 can be stored from the register file 8 in the DEC stage, removing these functions, after the data extended when read from the RAM 19 is stored in the register file 8 without fail. Although the waiting time of the pipeline increases as compared with the above described embodiment, the extension in the zero-extension unit 22 can be conducted in the WB stage where the processing amount is less than the other stages in addition to the access of the RAM 19, as compared with the conventional art. Further, as the extension is limited to the zero-extension only where the delaying time is comparatively small, the addition of the processing time of the WB stage can be refrained from.

Also, although in the embodiment, the selection of the ME bypass 23 in the D1 selector 11 and the D2 selector 12 is controlled by the contents of the ME bypass use inhibit flag 25 provided, by removing theses function, a fixing operation can be conducted for usual selection of the ME bypass 23 or not for usual selection thereof about the use after the reading 32-bit data read from the RAM 19.

Furthermore, although the ME bypass use inhibit flag 25 is set in accordance with the frequency of the operation clock in the embodiment, the setting operation can be conducted in accordance with the power voltage to be fed. For example, the former between the power voltage 5 V and 3.3 V can effect higher speed operation, because the former is smaller in the delay time of the general circuit. In the apparatus where the data processing apparatus is built-in, the ME bypass use inhibit flag 25 can be the co accordance with the mode when the constant-voltage mode, the low consumption power mode and so on are provided.

Also, although in the embodiment, the load & extension instruction is converted into the load instruction without extension and the zero-extension instruction or the sign-extension instruction by the assembler 3, the converting function can be provided within the microcomputer 4. In this case, a converting unit having the converting function can be provided immediately before the I latch 6 or the instruction decoder 7 or the within the instruction decoder 7. Also, the converting function can be provided in a compiler.

Furthermore, although in the above described embodiment, the bit width such as register file 8 or the like is made 32 bits, and the data of 8 bits and 16 bits are read from the RAM 19 and extended, completely the same construction can be provided even in a case where the bit width of the register file 8 and so on is made 16 bits, and the data of 8 bits can be read and extended from the RAM 19, or where the bit width of the register file 8 and so on is made 64 bits and the data of 8 bits, 16 bits, 32 bits are read and extended from the RAM 19.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data processing apparatus for performing a pipeline operation comprising a plurality of pipeline stages, each of said plurality of pipeline stages being processed in parallel to one another, said apparatus comprising:

a system that issues a load & extension instruction that instructs a first processing operation for reading, from a storage portion, data having a bit-length shorter than a register length, and a second processing operation for performing one of a zero-extension operation and a sign-extension operation to the data so that the data has a bit-length equal to the register length, and accommodating the data into a register, and wherein the one of the zero-extension operation and the sign-extension operation in the second processing operation is executed in any one of a plurality of pipeline stages of a pipeline stream different from a pipeline stream where the first processing operation is executed, or the one of the zero-extension operation and the sign-extension operation is executed in a pipeline stage different from a pipeline stage in the pipeline stream where the reading of the data from the storage portion is executed in the first processing operation.

2. The data processing apparatus according to claim 1, further comprising:

bypassing means for transmitting the data from a pipeline stage where the operation for reading data of the storage portion is executed to a pipeline stage where an operation of a subsequent instruction using the data is executed; and inhibiting means for inhibiting transmitting by the bypassing means in accordance with predetermined conditions.

3. The data processing apparatus according to claim 2, wherein the inhibiting means inhibits transmitting by the bypassing means in accordance with at least one of an operational clock frequency of the data processing apparatus, a power voltage input to the data processing apparatus, and a load instruction type.

4. The data processing apparatus according to claim 1, further comprising:

converting means for converting the load & extension instruction into a load instruction instructing the first processing operation, and an extension instruction for instructing the second processing operation, wherein the one of the zero-extension operation and the sign-extension operation in the second processing operation is executed in a pipeline stream different from the pipeline stream of the first processing operation.

5. The data processing apparatus according to claim 2, further comprising:

converting means for converting the load & extension instruction into a load instruction instructing the first processing operation, and an extension instruction for instructing the second processing operation, wherein the one of the zero-extension operation and the sign-extension operation in the second processing operation is executed in a pipeline stream different from the pipeline stream of the first processing operation.

6. The data processing apparatus according to claim 3, further comprising:

converting means for converting the load & extension instruction into a load instruction instructing the first processing operation, and an extension instruction for instructing the second processing operation, wherein the one of the zero-extension operation and the sign-extension operation in the second processing operation is executed in a pipeline stream different from the pipeline stream of the first processing operation.

7. The data processing apparatus according to claim 1, further comprising:

an extension unit for performing the one of the zero-extension operation and the sign-extension operation in the second processing operation in a pipeline stage different from a pipeline stage where the reading operation in the first processing operation is executed.

8. The data processing apparatus according to claim 2, further comprising:

an extension unit for performing the one of the zero-extension operation and the sign-extension operation in the second processing operation in a pipeline stage different from a pipeline stage where the reading operation in the first processing operation is executed.

9. The data processing apparatus according to claim 3, further comprising:

an extension unit for performing the one of the zero-extension operation and the sign-extension operation in the second processing operation in a pipeline stage different from a pipeline stage where the reading operation in the first processing operation is executed.

10. The data processing apparatus according to claim 4, further comprising:

an extension unit for performing the one of the zero-extension operation and the sign-extension operation in the second processing operation in a pipeline stage different from a pipeline stage where the reading operation in the first processing operation is executed.

11. The data processing apparatus according to claim 5, further comprising:

an extension unit for performing the one of the zero-extension operation and the sign-extension operation in the second processing operation in a pipeline stage different from a pipeline stage where the reading operation in the first processing operation is executed.

12. The data processing apparatus according to claim 6, further comprising:

an extension unit for performing the one of the zero-extension operation and the sign-extension operation in the second processing operation in a pipeline stage different from a pipeline stage where the reading operation in the first processing operation is executed.

13. A data processing apparatus for performing a pipeline operation comprising a plurality of pipeline stages including at least an instruction execution stage, a memory access stage and a write back stage, the data processing apparatus comprising:

converting means for converting a load & extension instruction for reading data from a storage portion having a bit-length shorter than a register-length and for one of zero-extending and sign-extending the data to be accommodated in a register, to a load instruction for reading the data having the bit-length shorter than the register-length from the storage portion to accommodate the data in a lower portion of the register, and to an extension instruction for performing one of a zero-extension operation and a sign-extension operation to the data loaded in accordance with the load instruction; and instruction decoding means for only reading the data from the storage portion in the memory access stage when the load instruction is decoded by said instructions decoding means, and for controlling accommodation of the data into the lower portion of the register in the write back stage, and controlling the one of the zero-extension and sign-extension of the data accommodated in the register in one of the pipeline stages when the extension instruction is decoded by said instruction decoding means.

14. The data processing apparatus according to claim 13, wherein said converting means converts only a load & sign-extension instruction within the load & extension instruction to the load instruction and to a sign-extension instruction for performing the sign-extension operation to the data loaded in accordance with the load instruction, so that the data has a bit-length equal to the register length.

15. The data processing apparatus according to claim 14, further comprising:

a sign-extension unit that performs sign-extension operation on the data in one of the instruction execution stage and the memory access stage.

16. The data processing apparatus, according to claim 15, further comprising:

a zero-extension unit that performs zero-extension operation on the data in one of the memory access stage and the write back stage so that the data has a bit-length equal to the register length, wherein the instruction decoding means reads the data in the memory access stage of the instruction being processed when a load & zero-extension instruction is decoded to control the zero-extension operation by the zero-extension unit, and controls the sign-extension operation to the data specified by the instruction being processed by the sign-extension unit when the sign-extension instruction is decoded.

17. The data processing apparatus according to claim 16, further comprising:

first bypassing means for transmitting the data read in the memory access stage of a preceding instruction to the instruction execution stage of a subsequent instruction using the data; and second bypassing means for transmitting the data to be stored in the register in the write back stage of a preceding instruction to the instruction execution of a subsequent instruction using the data, wherein the instruction decoding means includes bypass controlling means for activating the first bypassing means when the preceding instruction is a load instruction other than the load & zero-extension instruction, and for activating the second bypassing means when the preceding instruction is the load & zero-extension instruction.

18. The data processing apparatus according to claim 17, further comprising:

inhibiting means for inhibiting transmitting by the first bypassing means in accordance with predetermined conditions, wherein the bypass controlling means activates the second bypassing means, instead of the first bypassing means, when the transmitting by the first bypassing means is inhibited.

19. The data processing apparatus according to claim 18, wherein the inhibiting means inhibits transmitting by the first bypassing means in accordance with at least one of operation clock frequency of the data processing apparatus and a power voltage input to the data processing apparatus.

20. A data processing apparatus for performing a pipeline operation comprising a plurality of pipeline stages including at least an instruction execution stage, a memory access stage and a write back stage, the data processing apparatus comprising:

an extension unit for performing, in the write back stage, one of a zero-extension operation and a sign-extension operation to data having a bit-length shorter than a register length, so that the data has a bit-length equal to the register length; and instruction decoding means for performing only a data reading operation from a storage portion in the memory access stage, controlling a performing of the one of the zero-extension operation and the sign-extension operation to the data to accommodate the data in a register in the write back stage so that the data has a bit-length equal to the register length, performing the one of the zero-extension operation and the sign-extension operation to the data, and accommodating the data into the register, when a single load & extension instruction is decoded.

21. The data processing apparatus according to claim 20, further comprising:

first bypassing means for transmitting the data read in the memory access stage of a preceding instruction to the instruction execution stage of a subsequent instruction using the data; and second bypassing means for transmitting the one of the zero-extended and sign-extended data in the write back stage of the preceding instruction to the instruction execution stage of the subsequent instruction using the data, wherein the instruction decoding means includes bypass controlling means for activating the first bypassing means when the preceding instruction is a load instruction other than the load & extension instruction, and for activating the second bypassing means when the preceding instruction is the load and extension instruction.

22. The data processing apparatus according to claim 21, further comprising:

inhibiting means for inhibiting transmitting by the first bypassing means in accordance with predetermined conditions, wherein the bypass controlling means activates the second bypassing means, instead of the first bypassing means, when the transmitting by the first bypassing means is inhibited.

23. The data processing apparatus according to claim 22, wherein the inhibiting means inhibits transmitting by the first bypassing means in accordance with at least one of operation clock frequency of the data processing apparatus and a power voltage input to the data processing apparatus.

24. A data processing apparatus for performing a pipeline operation including a first stage for fetching an instruction, a second stage for performing instruction decoding and register reading, a third stage for executing an instruction and calculating an operand address, a fourth stage for accessing a memory and a fifth stage for performing data storing into a register, the apparatus comprising:

a first processing portion for fetching the instruction in the first stage;

a second processing portion for performing instruction decoding and register reading operations in the second stage;

an A latch for forwarding the data processed in the second processing portion to the third stage, a third processing portion for processing instruction execution and operand address calculation in the third stage, the third processing portion having an arithmetic unit for performing an operation on the data of the A latch, a sign-extension circuit for sign-extending the data of the A latch, and a third stage selector for selecting any one of an operation result and a sign-extension result;

a B latch for forwarding the third stage selector output to the fourth stage;

a fourth processing portion for performing a memory reading operation in the fourth stage, the fourth processing portion having accessing means for accessing the memory using the B latch output as a memory address to be accessed, and a fourth stage selector for selecting any one of the B latch output and the memory data accessed by the accessing means;

a C latch for forwarding a fourth selector output to the fifth stage;

a fifth processing portion for performing a register storing operation in the fifth stage, the fifth processing portion having a zero-extension circuit for zero-extending a C latch output and storing means for storing the C latch output or a zero-extension result into the resister;

first bypassing means for transmitting the fourth selector output to the A latch;

second bypassing means for transmitting an output of the zero-extension circuit to the A latch; and inhibiting means for inhibiting transmitting by the first bypassing means in accordance with predetermined conditions.

25. The data processing apparatus according to claim 24, wherein the inhibiting means inhibits the transmitting by the first bypassing means in accordance with any one of an operational clock frequency of the data processing apparatus and a power voltage input to the data processing apparatus.

26. The data processing apparatus according to claim 24, further comprising:

converting means for converting a load & sign-extension instruction for reading the data having a bit-length shorter than a register length, from a memory, sign-extending the data so that the data has a bit-length equal to the register length, and accommodating the data into a register, to a load instruction for reading the data from the memory to accommodate the data into the register, and to an extension instruction for sign-extending the data so as to have a bit-length equal to the register length.

27. The data processing apparatus according to claim 25, further comprising:

converting means for converting a load & sign-extension instruction for reading the data having a bit-length shorter than a register length, from a memory, sign-extending the data so that the data has a bit-length equal to the register length, and accommodating the data into a register, to a load instruction for reading the data from the memory to accommodate the data into the register, and to an extension instruction for sign-extending the data so as to have a bit-length equal to the register length.

28. A data processing apparatus for performing a pipeline operation comprising a plurality of pipeline stages, each of said plurality of pipeline stages being processed in parallel to one another, said apparatus comprising:

a system that issues a load & extension instruction that instructs a first processing operation for reading data having a bit-length shorter than a register length from a storage portion, and a second processing operation for performing one of a zero-extension operation and a sign-extension operation to the data so that the data has a bit-length equal to the register length, and accommodating the data into a register, and wherein the one of the zero-extension operation and the sign-extension operation in the second processing operation is executed in any one of a plurality of pipeline stages of a pipeline stream different from a pipeline stream where the first processing operation is executed, or the one of the zero-extension operation and the sign-extension operation is executed in a pipeline stage different from a pipeline stage in the pipeline stream where the reading of the data from the storage portion is executed in the first processing operation.

29. The data processing apparatus according to claim 28, further comprising:

a bypass circuit which transmits the data from a pipeline stage where the data reading operation of the storage portion is executed to a pipeline stage where an operation of a subsequent instruction using the data is executed; and an instruction decoder circuit which inhibits transmitting by the bypassing circuit in accordance with predetermined conditions.

30. The data processing apparatus according to claim 29, wherein the instruction decoder circuit inhibits transmitting by the bypass circuit in accordance with at least one of an operational clock frequency of the data processing apparatus, a power voltage input to the data processing apparatus, and a load instruction type.

31. The data processing apparatus according to claim 28, further comprising:

an assembler which converts the load & extension instruction into a load instruction for instructing the first processing operation, and an extension instruction for instructing the second processing operation, wherein the one of the zero-extension operation and the sign-extension operation in the second processing operation is executed in a pipeline stream different from the pipeline stream of the first processing operation.

32. The data processing apparatus according to claim 28, further comprising:

an extension unit for performing the one of the zero-extension operation and the sign-extension operation in the second processing operation in a pipeline stage different from a pipeline stage where the reading operation in the first processing operation is executed.

33. A data processing apparatus for effecting a pipeline operation comprising a plurality of pipeline stages including at least an instruction execution stage, a memory access stage and a write back stage, the data processing apparatus comprising:

an assembler which converts a load & extension instruction for reading data having a bit-length shorter than a register-length from a storage portion, and one of zero-extends and sign-extends the data to be accommodated in a register, to a load instruction for reading the data having the bit-length shorter than the register-length from the storage portion to accommodate the data in a lower portion of the register, and to an extension instruction for performing one of a zero-extension operation and a sign-extension operation to the data loaded in accordance with the load instruction; and an instruction decoder which performs only the data reading operation from the storage portion in the memory access stage when the load instruction is decoded, to control accommodation of the data into the lower portion of the register in the write back stage, and to control one of zero-extension and sign-extension of the data accommodated in the register in one of the pipeline stages when the extension instruction is decoded.

34. The data processing apparatus according to claim 33, wherein the assembler converts only a load and sign-extension instruction within the load and extension instruction to the load instruction and a sign-extension instruction which performs the sign-extension operation to the data loaded in accordance with the load instruction, so that the data has a bit-length equal to the register length.

35. The data processing apparatus according to claim 34, further comprising:

a sign-extension unit for performing the sign-extension operation to the data in one of the instruction execution stage and the memory access stage.

36. The data processing apparatus, according to claim 35, further comprising:

a zero-extension unit for performing the zero-extension operation to the data in one of the memory access stage and the write back stage so that the data has a bit-length equal to the register length, wherein the instruction decoder performs the data reading operation in the memory access stage of the instruction being processed when a load & zero-extension instruction is decoded to perform the zero-extension operation by the zero-extension unit, and performs the sign-extension operation to the data specified by the instruction being processed by the sign-extension unit when the sign-extension instruction is decoded.

37. The data processing apparatus according to claim 36, further comprising:

a first circuit for transmitting the data read in the memory access stage of a preceding instruction to the instruction execution stage of a subsequent instruction using the data; and a second circuit for transmitting the data to be stored in the register in the write back stage of a preceding instruction to the instruction execution of a subsequent instruction using the data, wherein the instruction decoder includes a controller which activates the first circuit when the preceding instruction is a load instruction other than the load & zero-extension instruction, and which activates the second circuit when the preceding instruction is the load & zero-extension instruction.

38. The data processing apparatus according to claim 37, further comprising:

a system which inhibits transmitting by the first circuit in accordance with predetermined conditions, wherein the controller activates the second circuit, instead of the first circuit, when the transmitting by the first circuit is inhibited.

39. The data processing apparatus according to claim 38, wherein the system inhibits transmitting by the first circuit in accordance with at least one of operation clock frequency of the data processing apparatus and a power voltage input to the data processing apparatus.

40. A data processing apparatus for performing a pipeline operation comprising a plurality of pipeline stages including at least an instruction execution stage, a memory access stage and a write back stage, the data processing apparatus comprising:

an extension unit which performs one of a zero-extension operation and a sign-extension operation to the data in the write back stage, the data having a bit-length shorter than a register length, so that the data has a bit-length equal to the register length; and an instruction decoder which performs only a data reading operation from a storage portion in the memory access stage, controls performing the one of the zero-extension operation and the sign-extension operation to the data to accommodate the data in a register in the write back stage so that the data has a bit-length equal to the register length, performs the one of the zero-extension operation and the sign-extension operation to the data, and accommodates the data into the register, when a single load & extension instruction is decoded by the instruction decoder.

41. The data processing apparatus according to claim 40, further comprising:

a first circuit which transmits the data read in the memory access stage of a preceding instruction to the instruction execution stage of a subsequent instruction using the data; and second circuit which transmits the one of the zero-extended and sign-extended data in the write back stage of the preceding instruction to the instruction execution stage of the subsequent instruction using the data, wherein the instruction decoder includes controller for activating the first circuit when the preceding instruction is a load instruction other than the load & extension instruction, and for activating the second circuit when the preceding instruction is the load and extension instruction.

42. The data processing apparatus according to claim 41, further comprising:

a system which inhibits transmitting by the first circuit in accordance with predetermined conditions, wherein the controller activates the second circuit, instead of the first circuit, when the transmitting by the first bypass circuit is inhibited.

43. The data processing apparatus according to claim 42, wherein the system inhibits transmitting by the first circuit in accordance with at least one of operation clock frequency of the data processing apparatus and a power voltage input to the data processing apparatus.

44. A data processing apparatus for performing a pipeline operation including a first stage in which an instruction is fetched, a second stage in which instruction decoding and register reading are performed, a third stage in which an instruction and calculating of an operand address are executed, a fourth stage in which a memory is accessed and a fifth stage in which data storing into a register is performed, the apparatus comprising:

a first processing portion that fetches the instruction in the first stage;

a second processing portion that performs instruction decoding and register reading operations in the second stage;

an A latch that transmits the data processed in the second processing portion to the third stage, a third processing portion that performs instruction execution and operand address calculation in the third stage, the third processing portion having an arithmetic unit for operating on the data of the A latch, a sign-extension circuit for sign-extending the data of the A latch, and a third stage selector that selects any one of an operation result and a sign-extension result;

a B latch that transmits the third selector output to the fourth stage;

a fourth processing portion that performs a memory reading operation in the fourth stage, the fourth processing portion including a system that accesses the memory using the B latch output as a memory address to access, and a fourth stage selector that selects any one of the B latch output and the memory data accessed by the accessing means;

a C latch that transmits a fourth selector output to the fifth stage;

a fifth processing portion for performing a register storing operation in the fifth stage, the fifth processing portion having a zero-extension circuit for zero-extending a C latch output and register storage unit that stores the one of the C latch output and a zero-extension result into the resister storage unit;

a first circuit which transmits the fourth stage selector output to the A latch;

a second circuit which transmits an output of the zero-extension circuit to the A latch; and an instruction decoder which inhibits transmitting by the first circuit in accordance with predetermined conditions.

45. The data processing apparatus according to claim 44, wherein the instruction decoder inhibits transmitting by the first circuit in accordance with any one of an operational clock frequency of the data processing apparatus and a power voltage input to the data processing apparatus.

46. The data processing apparatus according to claim 44, further comprising:

an assembler which converts a load & sign-extension instruction that reads the data having a bit-length shorter than a register length from a memory, sign-extends the data so that the data has a bit-length equal to the register length, and accommodates the data into a register, into a load instruction that reads the data from the memory to accommodate the data into the register, and into an extension instruction that sign-extends the data so as to have a bit-length equal to the register length.

47. The data processing apparatus according to claim 45, further comprising:

an assembler which converts a load & sign-extension instruction that reads the data having a bit-length shorter than a register length from a memory, sign-extends the data so that the data has a bit-length equal to the register length, and accommodates the data into a register, into a load instruction that reads the data from the memory to accommodate the data into the register, and into an extension instruction that sign-extends the data so as to have a bit-length equal to the register length.

* * * * *